(12) United States Patent
Tachibana et al.

(10) Patent No.: US 8,092,906 B2
(45) Date of Patent: Jan. 10, 2012

(54) ADHESIVE SHEET FOR STEEL PLATE

(75) Inventors: Katsuhiko Tachibana, Osaka (JP);
Mitsuo Matsumoto, Osaka (JP);
Manabu Matsunaga, Osaka (JP); Takio Itou, Osaka (JP)

(73) Assignee: Nitto Denko Corporation, Osaka (JP)

( * ) Notice: Subject to any disclaimer, the term of this patent is extended or adjusted under 35 U.S.C. 154(b) by 840 days.

(21) Appl. No.: 10/902,879

(22) Filed: Aug. 2, 2004

(65) Prior Publication Data

US 2005/0032447 A1    Feb. 10, 2005

(30) Foreign Application Priority Data

Aug. 8, 2003 (JP) ................ 2003-206683

(51) Int. Cl.
*B32B 7/12* (2006.01)

(52) U.S. Cl. ........... 428/355 EP; 428/343; 428/355 AC; 442/149; 442/154; 442/156; 442/180

(58) Field of Classification Search .............. 428/343
See application file for complete search history.

(56) References Cited

U.S. PATENT DOCUMENTS

| | | | | |
|---|---|---|---|---|
| 3,386,527 A * | 6/1968 | Daubert et al. | ............... | 181/208 |
| 3,684,617 A * | 8/1972 | Windecker | ............... | 156/330 |
| 3,958,055 A * | 5/1976 | Hadley et al. | ............... | 428/198 |
| 4,251,928 A * | 2/1981 | Rotar et al. | ............... | 34/116 |
| 4,263,352 A * | 4/1981 | Kaltenbach et al. | ............... | 427/379 |
| 4,656,084 A * | 4/1987 | McCoy et al. | ............... | 428/378 |
| 5,151,327 A * | 9/1992 | Nishiyama et al. | ............... | 428/343 |
| 5,204,386 A * | 4/1993 | Ersun-Hallsby et al. | ............... | 523/443 |
| 5,241,512 A | 8/1993 | Argy et al. | | |
| 5,487,928 A | 1/1996 | Fujimoto | | |
| 5,908,902 A * | 6/1999 | Pfeil et al. | ............... | 525/524 |

FOREIGN PATENT DOCUMENTS

| | | |
|---|---|---|
| EP | 1241 207 A1 | 9/2001 |
| JP | 2111538 | 4/1990 |
| JP | 07-068695 | 3/1995 |
| JP | 8-267665 | 3/1995 |
| JP | 09-123356 | 5/1997 |
| WO | WO01/88033 | 11/2001 |

* cited by examiner

*Primary Examiner* — Alicia Chevalier
*Assistant Examiner* — Anish Desai
(74) *Attorney, Agent, or Firm* — Edwards Neils PLLC; Jean C. Edwards, Esq.

(57) ABSTRACT

The invention provides an adhesive sheet for steel plate that can abate the emission of organic volatile components, while providing good reinforcing effect and vibration suppression effect. In an adhesive sheet for steel plate is provided that includes a restricting layer and a resin layer, the restricting layer having a resin-coated glass fiber cloth made by weaving glass fiber bundles, which are formed by bundling a plurality of glass filaments, into a glass fiber cloth and impregnating epoxy resin composition in the glass fiber cloth, the resin-coated glass fiber cloth having air permeability of not more than 0.5 $cm^3/cm^2$/sec. and a permeability rate of the epoxy resin composition to the glass fiber bundles in the range of 20-70%.

6 Claims, 1 Drawing Sheet

FIG.1

ADHESIVE SHEET FOR STEEL PLATE

This application claims priority from Japanese Patent Application No. 2003-206683, filed Aug. 8, 2003, the entire contents of which are herein incorporated by reference to the extent allowed by law.

BACKGROUND OF THE INVENTION

1. Field of the Invention

The present invention relates to an adhesive sheet for steel plate and, more particularly, to an adhesive sheet for steel plate which is used to be adhesively bonded to steel plate used in a variety of industrial machines such as transportation machines.

2. Description of the Prior Art

In general, a steel plate for a shell of an automotive vehicle is manufactured in the form of a thin sheet having a thickness generally in the range of 0.6 mm to 0.8 mm, for reduction in weight of a vehicle body. As is known, a steel plate reinforcing sheet is adhesively bonded to the inside of the steel plate for a shell of an automotive vehicle, for the reinforcement purpose.

This steel plate reinforcing sheet is, for example, adhesively bonded in a fabrication process of the steel plate of the shell of the automotive vehicle and thermally foamed by using the heat generated at the time of the electrodeposition coating, to develop its reinforcing property. For example, JP Laid-open (Unexamined) Patent Publication No. Hei 7-68695 proposes a steel plate reinforcing sheet comprising a foaming resin layer and a restricting layer on which the foaming resin layer is laminated.

As the steel plate for the shell of the automotive vehicle is in the form of a thin sheet panel, a fluttering sound is generated from the moving vehicle and an undesired sound or noise is generated from the vehicle door when opened or closed. In order to suppress the generation of the fluttering sound or the undesired sound or noise, JP Laid-open (Unexamined) Patent Publication No. Hei 9-123356 proposes a vibration suppression sheet formed of rubber composition to be laminated on the restricting layer.

Both of the steel plate reinforcing sheet described in JP Laid-open (Unexamined) Patent Publication No. Hei 7-68695 and the vibration suppression sheet described in JP Laid-open (Unexamined) Patent Publication No. Hei 9-123356 use a resin-coated glass fiber cloth, i.e. a glass fiber cloth coated with resin, as the restricting layer. Particularly, the resin-coated glass fiber cloth, which is a glass fiber cloth coated with melamine resin, is used, in terms of heat resistance, workability, and adhesiveness to a foaming resin layer and a damping (vibration suppression) layer.

Meanwhile, from the viewpoint of environmental measures in recent years, strict restrictions are being increasingly required on the emission of organic volatile components from automobile parts and members. The resin-coated glass fiber cloth covered with the melamine resin emits formaldehyde, thus involving the disadvantage that it cannot satisfy such a requirement.

To abate the emission of formaldehyde, epoxy resin is an encouraging alternative. However, when the glass fiber cloth is impregnated with epoxy resin to such an extent that can provide a sufficient seal, the tensile strength and the elasticity of the epoxy-resin-coated glass fiber cloth, serving as the restricting layer, increases excessively. As a result, the workability in punching and cutting processes is reduced and also the fitness in a patterned steel panel is reduced. Thus, this epoxy-resin-coated glass fiber cloth suffers from the disadvantages that sufficient reinforcing effect and vibration suppressing effect cannot be obtained.

SUMMARY OF THE INVENTION

It is the object of the present invention to provide an adhesive sheet for steel plate that can provide abatement in emission of organic volatile components, while also providing good reinforcing effect and vibration suppression effect.

The present invention provides an adhesive sheet for steel plate comprising a restricting layer and a resin layer, wherein the restricting layer comprises a resin-coated glass fiber cloth made by weaving glass fiber bundles, which are formed by bundling a plurality of glass filaments, into a glass fiber cloth and impregnating epoxy resin composition in the glass fiber cloth, the resin-coated glass fiber cloth having air permeability of not more than $0.5\ cm^3/cm^2/sec.$ and a permeability rate of the epoxy resin composition to the glass fiber bundles in the range of 20-70%.

In the present invention, it is preferable that the epoxy resin composition in the resin-coated glass fiber cloth comprises 1-10 parts by weight of acrylic acid polymer per 100 parts by weight of the epoxy resin composition and is impregnated in the glass fiber cloth in a proportion of 2-15 parts by weight of the epoxy resin composition per 100 parts by weight of the glass fiber cloth.

In the present invention, it is preferable that a mass of the glass fiber cloth is in the range of 150-300 $g/m^2$.

In the present invention, it is preferable that the resin layer is formed from foam composition comprising epoxy resin and a foaming agent or from foam composition comprising aromatic epoxy resin, styrene synthetic rubber and a foaming agent, or the resin layer is formed from rubber composition comprising rubber.

The adhesive sheet for steel plate of the present invention has the capabilities of sufficiently reinforcing the steel plate or suppressing vibration of the steel plate, and the capability of sufficiently abating the emission of organic volatile compounds, such as formaldehyde. Hence, the adhesive sheet for steel plate of the present invention can be used effectively for the steel plates used in a variety of industrial machines such as transportation machines by adhesive bonding.

BRIEF DESCRIPTION OF THE DRAWINGS

In the drawings.

(a) illustrates the process of preparing the adhesive sheet for steel plate and peeling off an exfoliate paper from the same adhesive sheet.

(b) illustrates the process of adhesively bonding the adhesive sheet for steel plate to the steel plate and.

(c) illustrates the process of foaming the adhesive sheet for steel plate by heating.

DESCRIPTION OF THE INVENTION

An adhesive sheet for a steel plate of the present invention comprises a restricting layer and a resin layer.

In the present invention, the restricting layer serves to provide tenacity for the resin layer, and a resin-coated glass fiber cloth is used as the restricting layer. The resin-coated glass fiber cloth is made by weaving glass fiber bundles, which are formed by bundling a plurality of glass filaments into a glass fiber cloth, and impregnating epoxy resin composition in the woven glass fiber cloth.

This resin-coated glass fiber cloth can be obtained by impregnating water dispersion of the epoxy resin composition in the glass fiber cloth and, then, drying the resulting glass fiber cloth, to coat the glass fiber cloth with the epoxy resin composition.

The glass fiber cloth used in the present invention can be obtained by tying a plurality of glass filaments produced by extending a molten glass in bundles to form glass fiber bundles and then weaving those glass fiber bundles into a cloth by using an air-jet weaving loom and the like, for example.

The glass fiber cloth is usually woven in a plain weave, though no particular limitation is imposed on a weaving structure of the glass fiber cloth. It may be woven in a varied plain weave, including a mat weave, and a rib weave, a twill weave, a sateen weave, or others.

Also, no particular limitation is imposed on yarn number and twist number which are determined by a diameter of the glass filament in a glass fiber bundle and the number of glass fiber bundles.

Further, although no particular limitation is imposed on the count of glass fiber bundles, it is preferable that the count of glass fiber bundles is selected so that the mass of glass fiber cloth being coated with the resin can be on the order of 150-300 $g/m^2$. When the mass is less than 150 $g/m^2$, the glass fiber cloth is low in tensile strength and elasticity, so that it may be unsuitable for the restricting layer. On the other hand, when the mass is more than 300 $g/m^2$, the glass fiber cloth increases in weight unnecessarily and also reduces in flexibility, so that there may be cases where it becomes hard to roll up the resin-coated glass fiber cloth; the fitness of the adhesive sheet for steel plate in the patterned steel panel is reduced; and the tensile strength is increased so excessively that the workability in punching and cutting processes is reduced. It is further preferable that the mass of glass fiber cloth before being coated with the resin is in the range of 180-260 $g/m^2$.

The mass of the glass fiber cloth can be determined by the measuring method in conformity with Japanese Industrial Standards (JIS) R3420-7.2.

The glass fiber cloth having the mass of this order usually has thickness on the order of 150-350 μm and air permeability on the order of 2-20 $cm^3/cm^2$/sec.

Preferably, the glass fiber cloth used in the present invention has the yarn number of the glass fiber bundle in the range of 5-250 tex (tex yarn number), the diameter of the glass filament in the range of 3-13 μm, the number of bundles in the range of 100-800, the twist number of the glass fiber bundle in the range of 0.1-5.0 (number of times)/25 mm, and the count of the glass fiber bundle in the range of 30-80/25 mm.

In the manufacture of the glass fiber cloth, a sizing agent is usually allowed to adhere to the glass fiber bundles, in order to protect the glass filaments from a mechanical shock during a manufacturing process. Specifically, a primary sizing agent is allowed to adhere to the glass fiber bundles during a fiber forming process, and a secondary sizing agent is allowed to adhere to the glass fiber bundles serving as the warp yarn before weaving.

In the manufacture of the glass fiber cloth used in the present invention, the water dispersion of the epoxy resin composition may be impregnated in the glass fiber cloth with the sizing agent adhering thereto, or may be impregnated in the glass fiber cloth after degreased to remove the sizing agent therefrom. Also, the glass fiber cloth may be treated using silane coupling agent, in order to enhance the adhesive bonding of the glass fiber cloth to the epoxy resin composition.

Further, after the glass fiber cloth is made by weaving the glass fiber bundles, the glass fiber cloth may be subjected to an open process, such as a high-pressure water flow process or a submerged ultrasonic disintegration process, to widen the glass fiber bundles of warp yarn and welt yarn, so that it can be used in the form of the opened glass fiber cloth as is closed to some extent. Although care should then be taken not to produce a bowed filling and the like by the open process, since the glass fiber cloth itself is put in the close-weave-like state to some extent, it can develop a good property, depending on the purpose and application of the adhesive sheet for the steel plate.

In the present invention, the epoxy resin composition comprises at least epoxy resin and a curing agent. Preferably, it further comprises acrylic acid polymer.

Water dispersed epoxy resin is preferably used as the epoxy resin, to properly control a sealed state of and an elasticity modulus of the resin-coated glass fiber cloth. Using the water dispersed epoxy resin can facilitate the control of the amount of epoxy resin impregnated (which is synonymous with the coverage), as well as the control of a solid content of the dispersion liquid and a viscosity thereof. This can provide the advantage that the resin-coated glass fiber cloth which is in the sufficiently sealed state and having an adequate tensile strength and an elasticity modulus can be obtained.

It is to be added in this connection that using a solvent epoxy resin makes it difficult to provide such a control, and, using an organic solvent worsens working conditions as well in the resin coating process.

The water dispersed epoxy resins that may be used include, for example, bisphenol epoxy resin, such as bisphenol A type epoxy resin, bisphenol F type epoxy resin, and bisphenol S type epoxy resin. Using the bisphenol epoxy resin can provide an increased curing rate, as compared with a novolak epoxy resin, thus achieving improvement in working efficiency.

No particular limitation is imposed on the curing agent, as long as it can be commonly used as the curing agent for the epoxy resin. For example, an amine compound, such as polyamine, dicyandiamide, and an isocyanate compound can be cited as the curing agent. The mixing ratio of the curing agent is preferably in the range of 1-15 parts by weight, or preferably 1.2-4.0 parts by weight, per 100 parts by weight of the epoxy resin composition (solid content). When the mixing ratio of the curing agent is in this range, an adequate tensile strength and elasticity can be easily obtained. These curing agents may be used alone or in combination of two or more. Preferably, polyamine and dicyandiamide are used, in terms of excellence in temporal stability of water dispersion, curing rate, and workability. If the curing of the epoxy resin does not proceed, then the resin-coated glass fiber cloth may be reduced in elasticity modulus to induce reduction in workability (punching and cutting), or the adhesive bonding of the glass fiber bundles may be reduced to induce reduction in tensile strength of the glass fiber cloth.

No particular limitation is imposed on the acrylic acid polymer. For example, polyacrylic acid, polymethacrylic acid, polyacrylic ester, polymethacrylic ester, and derivatives thereof, and copolymers thereof can be cited as the acrylic acid polymer. The mixing ratio of the acrylic acid polymer to the total amount of water dispersion of the epoxy resin composition is preferably in the range of 0.2-2.0 weight %. When the mixing ratio of the acrylic acid polymer is in this range, the acrylic polymer can be allowed to act as a thickening agent in the water dispersion by adjusting the pH of the water dispersion to be on the order of pH8-12 using ammonia water and the like. As a result of this, the viscosity of the water dispersion of the epoxy resin composition can be controlled to a desired viscosity and thus a penetration rate of the epoxy resin composition to the glass fiber bundle can be controlled to be in the range of 20-70%. Also, the acrylic acid polymer is different in refractive index from the glass and the epoxy resin, thus contributing to an opacifying effect of the resin-coated glass fiber cloth. In order to provide an improved opacifying effect, while obtaining the adequate tensile strength, elasticity and flexibility of the resin-coated glass fiber cloth serving as the restricting layer, the acrylic acid polymer is preferably mixed in the proportion of 1-10 parts by weight, or preferably 1.5-5 parts by weight, per 100 parts by weight of epoxy resin composition (solid content).

In addition to the epoxy resin, the curing agent, and the acrylic acid polymer cited above, known additives, such as, for example, a curing accelerator, an organic silane compound, an emulsifying agent, an antifoaming agent, and a pH adjuster, and other resin than the epoxy resin may be mixed in the epoxy resin composition in a proper proportion.

The curing accelerators that may be used include, for example, imidazoles, tertiary amines, and phosphorus compounds. The curing accelerator is preferably mixed in the epoxy resin composition in the proportion of 0.5-2 parts by weight per 100 parts by weight of the epoxy resin composition (solid content).

The organic silane compounds that may be used include, for example, amino silanes and epoxy silanes. The organic silane compound is preferably mixed in the resin-coated glass fiber cloth to be in the proportion of 0.01-0.5 parts by weight per 100 parts by weight of the glass fiber cloth.

To obtain the resin-coated glass fiber cloth used in the present invention, the water dispersion of the epoxy resin composition is impregnated in the glass fiber cloth, first. The impregnation can be carried out by using a known dipping method, such as dipping, spraying, and kiss-roll coating. It is preferable that the water dispersion of the epoxy resin composition is squeezed excess off, after impregnated. This squeezing enables the control of an amount of epoxy resin composition to be impregnated in or an amount of epoxy resin composition to adhere to the glass fiber cloth and the control of the air permeability.

Then, the resulting glass fiber cloth is dried to form the glass fiber cloth coated with the epoxy resin composition. The resin-coated glass fiber cloth used in the present invention can be obtained in the manner mentioned above. The drying can be carried out by heating at usually 100-250° C. until water evaporates from the resin impregnated glass fiber cloth.

The epoxy resin composition can be prepared in the form of the water dispersion of the epoxy resin composition by adding the epoxy resin, curing agent, and acrylic acid polymer as cited above and, if desired, other components and mixing in the water under stirring. In the preparation of the water dispersion, it is preferable that alkaline water solution, such as ammonia water, is further added to adjust the pH of the water dispersion of the epoxy resin composition to be on the order of pH8-12. This pH adjustment enables the control of the viscosity of the water dispersion of the epoxy resin composition to $300-900 \times 10^{-3}$ Pa·sec.

When the viscosity of the water dispersion of the epoxy resin composition is less than $300 \times 10^3$ Pa·sec., the epoxy resin is excessively permeated in the glass fiber bundles. As a result of this, the amount of the epoxy resin impregnated for the sealing is increased so that the tensile strength and elasticity modulus of the resin-coated glass fiber may increase excessively. On the other hand, when the viscosity of the water dispersion of the epoxy resin composition is more than $900 \times 10^3$ Pa·sec., the temporal stability of the water dispersion of the epoxy resin composition may be reduced and it may become difficult to control the amount of epoxy resin composition impregnated, resulting in significant reduction in workability. It is further preferable that the viscosity of the water dispersion of the epoxy resin composition is in the range of $400-800 \times 10^3$ Pa·sec.

Also, in the preparation of the water dispersion, it is preferable that the solid content of the epoxy resin composition in the water dispersion (i.e., the solid content of the epoxy resin composition) is in the range of 10-30 weight %.

When the solid content of the epoxy resin composition in the water dispersion is less than 10 weight %, there may be cases where the working efficiency is reduced; the amount of the resin impregnated is reduced; and the resin coating on the glass fiber cloth becomes insufficient, so that sufficient sealing may not be achieved. On the other hand, when the solid content of the epoxy resin composition in the water dispersion is more than 30 weight %, it may be difficult to control the amount of the resin impregnated. It is further preferable that the solid content of the epoxy resin composition in the water dispersion is in the range of 15-25 weight %.

In the resin-coated glass fiber cloth thus obtained, it is preferable that the amount of the epoxy resin composition impregnated in the glass fiber cloth after it is dried in the range of 2-15 parts by weight per 100 parts by weight of glass fiber cloth. When the amount of the epoxy resin composition impregnated is less than 2 parts by weight, the tensile strength and the elasticity modulus of the resin-coated glass fiber cloth may be reduced too much to obtain sufficient shape retention and insufficient sealing may be provided. On the other hand, when the amount of the epoxy resin composition impregnated is more than 15 parts by weight, the tensile strength and the elasticity modulus of the resin-coated glass fiber cloth may be increased excessively, and as such may provide reduction in workability in punching and cutting, reduction in flexibility and thus reduction in fitness of the adhesive sheet for steel plate in the patterned steel panel, and it becomes difficult to roll up the resin-coated glass fiber cloth. It is further preferable that the amount of the epoxy resin composition impregnated in the glass fiber cloth after dried is in the range of 3-10 parts by weight per 100 parts by weight of glass fiber cloth.

Also, it is preferable that the air permeability is not more than 0.5 cm$^3$/cm$^2$/sec., or preferably not more than 0.1 cm$^3$/cm$^2$/sec., depending on the resin layer. The air permeability of this range can provide the sufficient sealing of the glass fiber cloth, and as such can make it hard for the resin layer to ooze and can also reduce a possible offset of the resin layer. The air permeability can be determined by the measuring method in conformity with JIS R3420-7.14.

It is preferable that a permeability rate of the epoxy resin composition to the glass fiber bundles is in the range of 20-70%, or preferably in the range of 30-60%. When the permeability rate is less than 20%, the workability in punching and cutting may be reduced. On the other hand, when the permeability rate is more than 70%, the glass fiber cloth may not be sealed unless the amount of the epoxy resin composition impregnated is increased.

The permeability rate of the epoxy resin composition to the glass fiber bundles can be determined by the following formula:

$$\text{Permeability rate (\%)}=S2/(S0-S1)\times 100$$

where S0 is a cross-sectional area of the glass fiber bundle;
S1 is a total cross-sectional area of the glass fiber filaments in a glass fiber bundle; and S2 is a cross-sectional area of the glass fiber bundle in which the epoxy resin composition is impregnated;

Although the glass fiber bundles usually have a substantially circular cross-section in the fiber forming process, they are deformed in cross-section in a generally arch shape (crescentic form) or a generally oval shape in the manufacturing process in which the glass fiber bundles are squeezed by rolling up and in the weaving process in which the glass fiber bundles are bound with each other.

In practice, the permeability rate is determined in the following manner. First, after the glass fiber cloth is impregnated with the water dispersion of the epoxy resin composition, it is squeezed off and dried, to thereby produce the resin-coated glass fiber cloth. Then, the resin-coated glass fiber cloth thus obtained is subjected to an image processing by using TVIP-4100 available from NIPPON AVIONICS CO., LTD. to analyze the cross-sectional area so as to determine the permeability rate.

Also, it is preferable that the tensile strength of the resin-coated glass fiber cloth thus produced is in the range of 650-1,000N. When the tensile strength is less than 650N, the shape retaining property of the adhesive sheet for steel plate may be deteriorated. On the other hand, when the tensile strength is more than 1,000N, the workability in punching and cutting may be reduced. The tensile strength can be determined by the measuring method in conformity with JIS R3420-7.4(a).

Further, a larger elasticity modulus is preferable for the workability in punching and cutting. Preferably, the elasticity modulus is not less than 9,000 N/mm$^2$. The elasticity modulus can be determined in the following manner. First, after a test piece of the resin-coated glass fiber cloth having a width of 25 mm is fixed in position with a fixture span of 150 mm, the testing piece is pulled by a tensile testing machine at a pulling speed of 100 mm/min. until it comes to have the tensile strength of 98N and then the elongation L (mm) of the test piece is measured. The elasticity modulus can be calculated from $98/(H \times 25) \times (150/L)$ by letting the thickness of the resin-coated glass fiber cloth=thickness H (mm) of the glass fiber cloth.

Also, it is preferable that the resin-coated glass fiber cloth has flexibility, in terms of the workability, such as easiness to roll, fitness of the adhesive sheet for steel plate in a patterned steel panel. Preferably, the flexibility is in the order of 700-850 mg when measured by the measuring method (flexural resilience) in conformity with JIS L1096-8.20.1. When the flexural resilience is more than 850 mg, the workability may be reduced, while on the other hand, when the flexural resilience is less than 700 mg, the workability (processability) and the strength may be reduced.

In the resin-coated glass fiber cloth thus produced, the glass fiber cloth is made in a close weave manner, while making the permeability rate of the epoxy resin composition to the glass fiber bundles low. This can provide the advantageous results that the oozing of the resin layer from the adhesive sheet for steel plate can be suppressed, that the good shape retention can be ensured, and that the good workability in punching and cutting can be achieved. In addition to this, the resin-coated glass fiber cloth has a proper tensile strength and a proper elasticity modulus. It also has a proper flexibility for the restricting layer and, besides, the emission of formaldehyde can be abated.

It is preferable that the restricting layer has a thickness in the range of e.g. 0.10-0.30 mm, or preferably in the range of 0.15-0.25 mm.

In the present invention, when the adhesive sheet for steel plate of the present invention is used for reinforcing the steel plate, the resin layer is formed of foam composition. On the other hand, when the adhesive sheet for steel plate of the present invention is used for suppressing vibration of the steel plate, the resin layer is formed of rubber composition.

The foam composition comprises at least epoxy resin and a foaming agent.

No particular limitation is imposed on the epoxy resin. The epoxy resins that may be used include, for example, aliphatic epoxy resin, aromatic epoxy resin, and modified epoxy resin.

The aliphatic epoxy resins that may be used include, for example, linear aliphatic epoxy resin, cyclic aliphatic epoxy resin, and heterocyclic aliphatic epoxy resin.

The aromatic epoxy resin is an epoxy resin containing a benzene ring as a molecular building unit in a molecular chain. No particular limitation is imposed on the aromatic epoxy resin. For example, bisphenol epoxy resin, such as bisphenol A type epoxy resin, dimer acid modified bisphenol A type epoxy resin, bisphenol F type epoxy resin and bisphenol S type epoxy resin, novolak epoxy resin, such as phenol novolak epoxy resin and cresol novolak epoxy resin, and naphthalene epoxy resin can be cited as the aromatic epoxy resin.

The modified epoxy resins that may be used include, for example, dimer acid modified bisphenol A type epoxy resin, amine modified bisphenol A type epoxy resin, and alcohol modified bisphenol A type epoxy resin.

These epoxy resins may be used alone or in combination. Of these epoxy resins, the aromatic epoxy resin is preferably used, and the bisphenol epoxy resin is also preferably used, in terms of reinforcement, and adhesiveness to the metal plate.

Epoxy equivalent of this epoxy resin is for example in the range of 150-350 g/eqiv., or preferably in the range of 200-300 g/equiv. The epoxy equivalent can be calculated from concentration of oxirane oxygen measured by the titration using hydrogen bromide.

The foaming agents that may be used include, for example, an inorganic foaming agent and an organic foaming agent.

The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, an N-nitroso compound (N,N'-dinitrosopentamethylenetetramine, N,N'-dimethyl-N,N'-dinitrosoterephthalamide, etc.), an azoic compound (e.g. azobis isobutyronitrile, azodicarbonamide, barium azodicarboxylate, etc.), alkane fluoride (e.g. trichloromonofluoromethane, dichloromonofluoromethane, etc.), a hydrazine compound (e.g. paratoluene sulfonyl hydrazide, diphenylsulfone-3,3'-disulfonyl hydrazide, 4,4'-oxybis (benzene sulfonyl hydrazide), allylbis (sulfonyl hydrazide), etc.), a semicarbazide compound (e.g. p-toluylenesulfonyl semicarbazide, 4,4'-oxybis(benzene sulfonyl semicarbazide, etc.), and a triazole compound (e.g. 5-morphoryl-1,2,3,4-thiatriazole, etc.).

The foaming agents may be in the form of thermally expansible microparticles comprising thermally expansive material (e.g. isobutane, pentane, etc.) which is encapsulated in a microcapsule (e.g. a microcapsule of thermoplastic resin, such as vinylidene chloride, acrylonitrile, acrylic ester and methacrylic ester). Commercially available products, such as Microsphere® (available from Matsumoto Yushi-Seiyaku Co., Ltd.), may be used as the thermally expansible microparticles.

These may be used alone or in combination. Of these foaming agents, 4,4'-oxybis(benzene sulfonyl hydrazide) is preferably used in terms of less susceptible to external factors and stable foaming.

The mixing ratio of the foaming agent is for example in the range of 1.0-10 parts by weight, or preferably 2.0-8.0 parts by weight, per 100 parts by weight of resin components (the term of "resin components" here means a total of epoxy resin and styrene synthetic rubber or means epoxy resin only in the case where styrene synthetic rubber is not included in the components (the same applied to the following)). The mixing ratio of the foaming agent of less than that may foam insufficiently to induce reduction in thickness and thus in reinforcement of the adhesive sheet for steel plate. On the other hand, the mixing ratio of the foaming agent of more than that may induce reduction of density and thus in reinforcement of the adhesive sheet for steel plate.

Also, it is preferable that this foam composition further comprises styrene synthetic rubber.

The term "styrene synthetic rubber" here is a synthetic rubber containing styrene of raw material as a molecular building unit in a molecular chain. No particular limitation is imposed on the styrene synthetic rubber. The styrene synthetic rubbers that may be used include, for example, styrene-butadiene rubber, such as styrene-butadiene random copolymer, styrene-butadiene-styrene block copolymer, styrene-ethylene-butadiene copolymer, and styrene-ethylene-butadiene-styrene block copolymer, and styrene-isoprene rubber, such as styrene-isoprene-styrene block copolymer. These styrene synthetic rubbers may be used alone or in combination. Of these styrene synthetic rubbers, styrene-butadiene rubber is preferably used, in terms of reinforcement and adhesiveness to an oiled surface of the steel plate.

The number average molecular weight of this styrene synthetic rubber is not less than 30,000, or preferably ranges from 50,000 to 1,000,000. The number of average molecular weight of less than 30,000 may induce reduction of adhesion of the adhesive sheet for steel plate particularly to the oiled steel plate.

The styrene synthetic rubber contains not more than 50 weight % styrene, or preferably not more than 35 weight % styrene. The styrene content of more than this may induce reduction of adhesion of the adhesive sheet for steel plate under low temperature.

Also, the Mooney viscosity of this styrene synthetic rubber ranges for example from 20 to 60 (ML1+4, at 100° C.), or preferably from 30 to 50 (ML1+4, at 100° C.).

The mixing ratio of the styrene synthetic rubber is for example in the range of 30-70 parts by weight, or preferably 40-60 parts by weight, per 100 parts by weight of the resin components. The mixing ratio of the styrene synthetic rubber of less than that may induce reduction of adhesion of the adhesive sheet for steel plate particularly to the oiled steel plate. On the other hand, the mixing ratio of the styrene synthetic rubber of more than that may induce reduction of reinforcement of the adhesive sheet for steel plate.

It is preferable that the foam composition includes epoxy modified styrene synthetic rubber, in addition to the components cited above. The epoxy modified styrene synthetic rubber is used to compatibilize the styrene synthetic rubber and the aromatic epoxy resin. The mixing of the epoxy modified styrene synthetic rubber can provide further improved adhesiveness and reinforcement.

The term "epoxy-modified styrene synthetic rubber" here is a synthetic rubber produced by modifying the styrene synthetic rubber with an epoxy group at an end of the molecular chain or in the molecular chain. Epoxy equivalent of the epoxy-modified styrene synthetic rubber preferably used is for example in the range of 100-10,000 g/eqiv., or preferably in the range of 400-3,000 g/equiv. The styrene synthetic rubber can be modified with an epoxy group by using a known method. For example, an epoxidizing agent, such as peracids and hydroperoxides, is allowed to react with a double bond in the styrene synthetic rubber in an inert solvent.

The epoxy-modified styrene synthetic rubbers that may be used include, for example, epoxy-modified styrene synthetic rubber wherein an epoxy group is introduced in a B polymer block of an A-B type block copolymer or an A-B-A type block copolymer (A represents a styrene polymer block, and B represents conjugated diene polymer block, such as a butadiene polymer block and an isoprene polymer block).

To be more specific, for example, epoxy-modified styrene•butadiene•styrene block copolymer, epoxy-modified styrene•ethylene•butadiene•styrene block copolymer, and epoxy-modified styrene•isoprene•styrene block copolymer can be used. These may be used alone or in combination.

Of these epoxy-modified styrene synthetic rubbers, epoxy-modified styrene•butadiene•styrene block copolymer is preferably used in terms of the compatibility of the reinforcement with the adhesiveness.

It is preferable that the weight average molecular weight of an A block copolymer, which is a styrene copolymer block of the A-B type block copolymer or the A-B-A type block copolymer, is on the order of 1,000 to 10,000, and the glass-transition temperature of the same is 7° C. or more. Also, it is preferable that the weight average molecular weight of a B block copolymer, which is a conjugated diene polymer block, is on the order of 10,000 to 500,000, and the glass-transition temperature of the same is −20° C. or less. It is preferable that a weight ratio of the A block copolymer to the B block copolymer (A block copolymer/B block copolymer) is in the range of 2/98-50/50, or preferably in the range of 15/85-30/70.

The mixing ratio of the epoxy-modified styrene synthetic rubber is for example in the range of 1-20 parts by weight, or preferably 5-15 parts by weight, per 100 parts by weight of the resin components. The mixing ratio of the epoxy-modified styrene synthetic rubber of less than this may induce reduction in reinforcement and adhesiveness of the adhesive sheet for steel plate. On the other hand, the mixing ratio of the epoxy-modified styrene synthetic rubber of more than this may induce reduction of adhesiveness of the adhesive sheet for steel plate under a low temperature.

Further, it is preferable that this foam composition includes an epoxy resin curing agent and/or a rubber cross-linking agent, in addition to the components cited above. The containing of the epoxy resin curing agent and/or the rubber cross-linking agent can provide improved reinforcement.

A known epoxy resin curing agent can be used as the epoxy resin curing agent. The epoxy resin curing agents that may be used include, for example, amine compounds, acid anhydride compounds, amide compounds, hydrazide compounds, imidazole compounds, and imidazoline compounds. In addition to these, phenol compounds, urea compounds, and polysulfide compounds can be cited as the epoxy resin curing agent.

The amine compounds that may be used include, for example, ethylenediamine, propylenediamine, diethylenetriamine, triethylenetetramine, amine adducts thereof, metaphenylenediamine, diaminodiphenylmethane, and diaminodiphenylsulfone.

The acid anhydride compounds that may be used include, for example, phthalic anhydride, maleic anhydride, tetrahydrophthalic anhydride, hexahydrophthalic anhydride, methyl nadic anhydride, pyromelletic anhydride, dodecenylsuccinic anhydride, dichlorosuccinic anhydride, benzophenonetetracarboxylic anhydride, and chlorendic anhydride.

The amide compounds that may be used include, for example, dicyandiamide and polyamide.

The hydrazide compounds that may be used include, for example, dihydrazide.

The imidazole compounds that may be used include, for example, methyl imidazole, 2-ethyl-4-methyl imidazole, ethyl imidazole, isopropyl imidazole, 2,4-dimethylimidazole, phenylimidazole, undecylimidazole, heptadecylimidazole, and 2-phenyl-4-methylimidazole.

The imidazoline compounds that may be used include, for example, methylimidazoline, 2-ethyl-4-methylimidazoline, ethylimidazoline, isopropylimidazoline, 2,4-dimethtylimidazoline, phenylimidazoline, undecylimidazoline, heptadecylimidazoline, and 2-phenyl-4-methyl imidazoline.

These may be used alone or in combination. Of these epoxy resin curing agents, dicyandiamide is preferably used in terms of adhesiveness.

The mixing ratio of the epoxy resin curing agent is for example in the range of 0.5-15 parts by weight, or preferably 1-10 parts by weight, per 100 parts by weight of the resin components. The mixing ratio of the epoxy resin curing agent of less than this may induce reduction in reinforcement. On the other hand, the mixing ratio of the epoxy resin curing agent of more than this may induce reduction in storage stability.

A known rubber cross-linking agent (a vulcanizing agent) that can allow the cross-linking of the styrene synthetic rubber or the epoxy-modified styrene synthetic rubber by heating can be used as the rubber cross-linking agent. The rubber cross-linking agents that may be used include, for example, sulfur, sulfur compounds, selenium, magnesium oxide, lead monoxide, organic peroxides (e.g. dicumyl peroxide, 1,1-ditert-butyl-peroxy-3,3-5-trimethylcyclohexane, 2,5-dimethyl-2,5-ditert-butyl-peroxyhexane, 2,5-dimethyl-2,5-ditert-butyl-peroxyhexane, 1,3-bis (tert-butyl-peroxy-isopropyl)benzene, tert-butyl-peroxy-ketone, and tert-butyl-peroxy-benzoate), polyamines, oximes (e.g. p-quione dioxime and p,p'-dibenzoyl quinone dioxime, etc.), nitroso compounds (e.g. p-dinitroso benzene, etc.), resins (e.g. alkyl phenol-formaldehyde resin, melamine-formaldehyde condensate), and ammonium salts (e.g. ammonium benzoate, etc.).

These may be used alone or in combination. Of these rubber cross-linking agents, sulfur is preferably used in terms of the curing property and the reinforcement.

The mixing ratio of the rubber cross-linking agent is for example in the range of 1-20 parts by weight, or preferably 2-15 parts by weight, per 100 parts by weight of the resin components. The mixing ratio of the rubber cross-linking agent of less than this may induce reduction in reinforcement. On the other hand, the mixing ratio of the rubber cross-linking agent of more than this may induce reduction of adhesion of the steel plate reinforcing sheet and may induce cost-defectiveness.

In addition to the components cited above, a foam auxiliary agent, a curing accelerator, a cross-linking accelerator, a filler, a tackifier, and a pigment may be included in the foam composition. Further, if desired, known additive, such as, for example, a thixotropic agent (e.g. montmorillonite, etc.), lubricant (e.g. stearic acid, etc.), an antiscorching agent, a stabilization agent, a softening agent, a plasticizer, an antiaging agent, an antioxidant, an ultraviolet absorber, a coloring agent, a mildewproofing agent, and a fire retardant, may be included in the foam composition in a proper proportion.

The foam auxiliary agents that may be used include, for example, zinc stearate, a urea compound, a salicyclic compound, and a benzoic compound. These foam auxiliary agents may be used alone or in combination. The mixing ratio of the foam auxiliary agent is for example in the range of 0.5-10 parts by weight, or preferably 1-5 parts by weight, per 100 parts by weight of the resin components.

The curing accelerators that may be used include, for example, imidazoles, tertiary amines, phosphorus compounds, quaternary ammonium salts, and organic metal salts. These curing accelerators may be used alone or in combination. The mixing ratio of the curing accelerator is for example in the range of 0.5-20 parts by weight, or preferably 1-10 parts by weight, per 100 parts by weight of the resin components.

The cross-linking accelerators that may be used include, for example, zinc oxide, dithiocarbamic acids, thiazoles, guanidines, sulfenamides, thiurams, xanthogenic acids, aldehyde ammonias, aldehyde amines, and thioureas. These cross-linking accelerators may be used alone or in combination. The mixing ratio of the cross-linking accelerator is for example in the range of 1-20 parts by weight, or preferably 3-15 parts by weight, per 100 parts by weight of the resin components.

The fillers that may be used include, for example, calcium carbonate (e.g. heavy calcium carbonate, light calcium carbonate, and Hakuenka® (colloidal calcium carbonate), etc.), talc, mica, clay, mica powder, bentonite, silica, alumina, aluminum silicate, titanium oxide, acetylene black, and aluminum powder. These fillers may be used alone or in combination. The mixing ratio of the filler is for example in the range of 50-150 parts by weight, or preferably 75-125 parts by weight, per 100 parts by weight of the resin components.

The tackifiers that may be used include, for example, rosin resin, terpene resin (e.g. terpene-aromatic liquid resin, etc.), coumarone-indene resin, petroleum resin (e.g. C5 petroleum resin, C5/C9 petroleum resin), phenol resin, xylene resin, and alkyd resin. These tackifiers may be used alone or in combination. The mixing ratio of the tackifier is for example in the range of 10-200 parts by weight, or preferably 20-150 parts by weight, per 100 parts by weight of the resin components.

The pigments that may be used include, for example, carbon black. The mixing ratio of the pigment is for example in the range of 0.5-20 parts by weight, or preferably in the range of 2-10 parts by weight, per 100 parts by weight of the resin components.

The foam composition can be prepared in the form of kneaded material by mixing the components cited above in the mixing ratios specified above and kneading them by using a mixing roll, a pressure kneader, or an extruder, for example, through not limited thereto.

It is preferable that the kneaded material obtained is prepared to have a flow tester viscosity (60° C., 20 kg load) for example in the range of 1,000-5,000 Pa·s, or preferably in the range of 1,500-4,000 Pa·s.

Thereafter, the kneaded material is rolled for example by calendaring, extrusion or press molding under temperature under which the foaming agent is not substantially decomposed, to form the resin layer of foam composition, though this is not particularly limitative. Then, the resin layer thus formed is adhesively bonded to the restricting layer. The adhesive sheet for steel plate is produced in this manner.

The resin layer formed of the foam composition thus produced has a thickness for example in the range of 0.2-3.0 mm, or preferably in the range of 0.5-1.3 mm.

A total thickness of the restricting layer and the resin layer of foam composition is for example in the range of 0.3-3.3 mm, or preferably in the range of 0.65-1.55 mm.

If desired, an exfoliate paper may be stuck on a surface of the resin layer of the adhesive sheet for steel plate.

In the adhesive sheet for steel plate thus obtained, it is preferable that a volume expansion ratio of the foam composition used as the resin layer ranges from 1.5 to 4.0 times, or preferably from 2.0 to 3.5 times, when foamed. It is preferable that a density of the foam layer after the resin layer is foamed (weight (g) of foam layer/volume of foam layer (g/cm$^3$)) is for example in the range of 0.2-0.8 g/cm$^3$, or preferably in the range of 0.3-0.7 g/cm$^3$.

The rubber composition comprises at least rubber.

The rubbers that may be used include, for example, styrene-butadiene rubber (e.g. styrene-butadiene random copolymer, styrene-butadiene styrene block copolymer, styrene-ethylene-butadiene copolymer, and styrene-ethylene-butadiene-styrene block copolymer), styrene-isoprene rubber (e.g. styrene-isoprene-styrene block copolymer), and styrene-isoprene-butadiene rubber, and polybutadiene rubber (1,4-polybutadiene rubber, syndioctactic-1,2-polybutadiene rubber, and acrylonitrile-butadiene rubber), polyisobutylene rubber, polyisoprene rubber, chloroprene rubber, isobutylene-isoprene rubber, nitrile rubber, butyl rubber, nitrile butyl rubber, acrylic rubber, recycled rubber, and natural rubber. These rubbers may be used alone or in combination. Of these rubbers, butyl rubber, and styrene-butadiene rubber, are preferably used in terms of adhesiveness, heat-resistance, and vibration suppressing property.

In addition to the components cited above, known additives, such as a filler, a tackifier, a softening agent and a pigment, and, if desired, a cross-linking agent (e.g. sulfur), a cross-linking accelerator, oils and fats (animal oil and fat, vegetable oil, mineral oil, etc.), a thixotropic agent (e.g. montmorillonite, etc.), lubricant (e.g. stearic acid, etc.), an antiscorching agent, a stabilization agent, a plasticizer, an antiaging agent, an antioxidant, an ultraviolet absorber, a coloring agent, a mildewproofing agent, and a fire retardant, may be included in the rubber composition in a proper proportion.

The fillers that may be used include, for example, the same filler as the one used for the foam composition. These fillers may be used alone or in combination. The mixing ratio of the filler is for example in the range of 20-250 parts by weight, or preferably 100-200 parts by weight, per 100 parts by weight of the rubber.

The tackifiers that may be used include, for example, the same tackifier as the one used for the foam composition. These tackifiers may be used alone or in combination. The mixing ratio of the tackifier is for example in the range of 10-150 parts by weight, or preferably 50-100 parts by weight, per 100 parts by weight of the rubber.

The softening agents that may be used include, for example, liquid resin, phthalic ester, phosphoric ester, paraffin chloride, polybutene, and polyisobutylene. These softening agents may be used alone or in combination. The mixing ratio of the softening agent is for example in the range of 10-150 parts by weight, or preferably 50-100 parts by weight, per 100 parts by weight of the rubber.

The pigments that may be used include, for example, the same pigment as the one used for the foam composition. The mixing ratio of the pigment is for example in the range of 2-100 parts by weight, or preferably 10-50 parts by weight, per 100 parts by weight of the rubber.

The rubber composition can be prepared in the form of kneaded material by mixing the components cited above in the mixing ratios specified above and kneading them by using a mixing roll, a pressure kneader, or an extruder, for example, through not limited thereto.

It is preferable that the kneaded material obtained is prepared to have a flow tester viscosity (50° C., 20 kg load) for example in the range of 5,000-30,000 Pa·s, or preferably in the range of 10,000-20,000 Pa·s.

Thereafter, the kneaded material is rolled for example by calendaring, extrusion or press molding, to form the resin layer of the rubber composition, though this is not particularly limitative. Then, the resin layer thus formed is adhesively bonded to the restricting layer. The adhesive sheet for steel plate is produced in this manner.

The resin layer of rubber composition thus produced has a thickness for example in the range of 0.8-3.0 mm, or preferably in the range of 1.0-2.0 mm.

A total thickness of the restricting layer and the resin layer of rubber composition is for example in the range of 0.9-3.3 mm, or preferably in the range of 1.15-2.25 mm.

If desired, an exfoliate paper is stuck on a surface of the resin layer of the adhesive sheet for steel plate.

Figure 1:
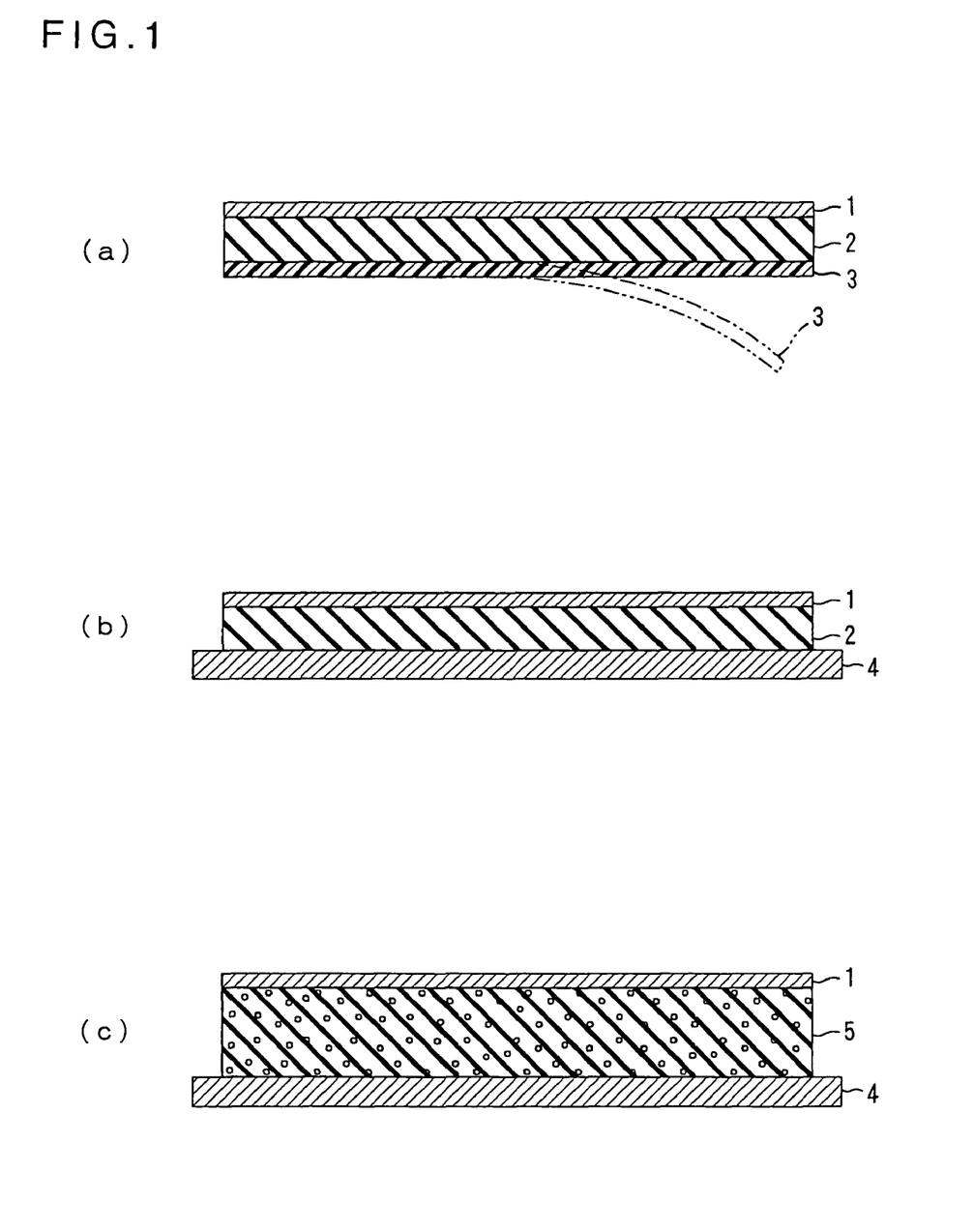
FIG. 1 is a process drawing showing an embodiment of a method of adhesively bonding an adhesive sheet for a sheet plate of the present invention to a steel plate.

The adhesive sheet for steel plate of the present invention thus obtained is adhesively bonded to the steel plate used in a variety of industrial machines such as transportation machines, for the reinforcement or vibration suppression purpose. To be more specific, as shown in FIG. 1(a), the adhesive sheet for steel plate of the present invention is formed by laminating the resin layer 2 on the restricting layer 1 and, if desired, the exfoliate paper 3 is stuck on the surface of the resin layer 2. In use, the exfoliate paper 3 is stripped from the surface of the resin layer 2, as indicated by a phantom line, first. Then, the surface of the resin layer 2 is adhesively bonded to the steel plate 4, as shown in FIG. 1(b). When the resin layer 2 is formed of foam composition, the resulting lamination is heated at a prescribed temperature (e.g. 160-210° C.) to foam, cross-link and cure the resin layer 2 formed of foam composition to form the foam layer 5, as shown in FIG. 1(c).

This adhesive sheet for steel plate of the present invention can be suitably used for reinforcing or suppressing vibration of a steel panel of a shell of an automobile for which weight saving is required.

When the adhesive sheet for steel plate is used, for example, for reinforcing the steel panel of the shell of the automobile, the adhesive sheet for steel plate is made to have the resin layer formed of the foam composition and is adhesively bonded to the steel panel in an assembling process of the steel panel of the shell of the automobile, first. Then, the adhesive sheet for steel plate adhesively bonded to the steel panel is thermally foamed, cross-linked and cured by using the heat generated at the time of the electrodeposition coating, to form the foam layer.

When the adhesive sheet for steel plate is used for suppressing vibration of the steel panel of the shell of the automobile, the adhesive sheet for steel plate is made to have the resin layer formed of the rubber composition and is adhesively bonded to the steel panel in the assembling process of the steel panel of the shell of the automobile.

In the adhesive sheet for steel plate of the present invention, the restricting layer is formed from the resin-coated glass fiber cloth having the air permeability of not more than 0.5 cm$^3$/cm$^2$/sec. and the permeability rate of the epoxy resin composition to the glass fiber bundles in the range of 20-70% as cited above. This resin-coated glass fiber cloth is made in a close weave manner, while making the permeability rate of the epoxy resin composition to the glass fiber bundles low. This can provide the advantageous results that the oozing of the resin layer from the adhesive sheet for steel plate can be suppressed, that the good shape retention can be ensured, and that the good workability in punching and cutting can be achieved. In addition to this, the resin-coated glass fiber cloth has a proper tensile strength and a proper elasticity modulus. It also has a proper flexibility for the restricting layer and, besides, the emission of formaldehyde can be abated.

Hence, the adhesive sheet for steel plate of the present invention having the capabilities of sufficiently reinforcing the steel plate or suppressing vibration of the steel plate, and the capability of sufficiently abating the emission of formaldehyde can be used effectively for the steel plates used in a variety of industrial machines such as transportation machines by adhesive bonding.

EXAMPLES

While in the following, the present invention will be described in further detail with reference to Examples and Comparative Example, the present invention is not limited to any of them.

(Preparation of Restricting Layer)

1) Production of Glass Fiber Cloth:

Glass fiber bundles (yarn number: 67.5 tex, diameter of glass filament: 9 μm, and number of bundles: 400) were woven into a plain cloth having a density of warp yarn of 44/25 mm and a density of welt yarn of 32/25 mm. Thereafter, the woven glass fiber cloth was thermally degreased to remove the sizing agent therefrom, thereby producing the glass fiber cloth of IPC standard 7628 type. The glass fiber cloth had a mass of 210 g/m$^2$, a thickness of 200 μm, and air permeability of 3 cm$^3$/cm$^2$/sec.

2) Preparation of Epoxy Resin Composition (Impregnating Solution):

Impregnating Solution 1:

0.7 parts by weight aminoethylaminopropyltrimethoxysilane (A1120 available from Union Carbide Corporation), 40 parts by weight water dispersion of bisphenol A type epoxy resin (Epolsion HC130 available from NIPPON NSC LTD. a solids content of 45 weight %), 1.5 parts by weight acrylic ester copolymer resin aqueous emulsion (Yodosol KA10 available from NIPPON NSC LTD. a solids content of 27 weight %), a curing agent solution prepared by dissolving 2 parts by weight dicyandiamide and 0.2 parts by weight 2-methylimidazole in 10 parts by weight hot water, and 0.36 parts by weight ammonia water (30 weight % solution) were added to 40 parts by weight water and, further, water was added thereto to amount to 100 parts by weight in total, thereby preparing the impregnating solution 1 comprising the water dispersion of the epoxy resin composition. The solids content of the impregnating solution 1 thus obtained and the viscosity of the same are shown in TABLE 1.

Impregnating Solution 2:

Except that the acrylic ester copolymer resin aqueous emulsion and the ammonia water were replaced with water, the same operation as in the impregnating solution 1 was carried out to prepare the impregnating solution 2 comprising the water dispersion of the epoxy resin composition.

3) Production of Resin-coated Glass Fiber Cloth:

Resin-coated Glass Fiber Cloth 1:

After a glass fiber cloth was impregnated with the impregnating solution 1, the impregnating solution 1 is squeezed excess off by using a mangle. Then, the resulting glass fiber cloth was made to pass through a dryer heated to 150° C., to obtain the resin-coated glass fiber cloth impregnated with the epoxy resin composition in a proportion of 4 parts by weight of epoxy resin composition per 100 parts by weight glass fiber cloth.

Resin-coated Glass Fiber Cloth 2:

After a glass fiber cloth was impregnated with the impregnating solution 2, the impregnating solution 2 is squeezed excess off by using the mangle. Then, the resulting glass fiber cloth was made to pass through the dryer heated to 150° C., to obtain the resin-coated glass fiber cloth having thickness of 2.0 mm and impregnated with the epoxy resin composition in the proportion of 4 parts by weight of epoxy resin composition per 100 parts by weight glass fiber cloth.

Resin-Coated Glass Fiber Cloth 3:

A resin-coated glass fiber cloth, which is a glass fiber cloth coated with melamine resin (ME-313 available from Nitto Boseki Co., Ltd.), was prepared.

Resin-coated Glass Fiber Cloth 4:

A resin-coated glass fiber cloth, which is a glass fiber cloth coated with melamine resin (ME-212 available from Nitto Boseki Co., Ltd.), was prepared.

4) Evaluation 4-1) Measurement of Air Permeability:

The air permeability of each of the resin-coated glass fiber cloths 1 and 2 obtained above was measured in conformity with JIS R3420-7.14. The results are shown in TABLE 1.

4-2) Measurement of Permeability Rate:

The each resin-coated glass fiber cloth 1, 2 thus obtained was subjected to an image processing by using TVIP-4100 available from NIPPON AVIONICS CO., LTD. to analyze the cross-sectional area so as to determine the permeability rate based on the formula given above. The results are shown in TABLE 1.

4-3) Measurement of Tensile Strength and Elasticity Modulus:

The tensile strength of the resin-coated glass fiber cloths 1, 2 was measured in conformity with JIS R3420-7.14. In the measurement, the elasticity modulus of the each resin-coated glass fiber cloth was determined in the following manner. The resin-coated glass fiber cloth was pulled at a pulling speed of 100 mm/min. until it reached the tensile strength of 98N, to measure the elongation L (mm) of the resin-coated glass fiber cloth. Then, the elasticity modulus of the each resin-coated glass fiber cloth was calculated from $98/(0.2\times25)\times(150/L)$. The results are shown in TABLE 1.

4-4) Evaluation of Flexibility:

The flexibility of the each resin-coated glass fiber cloth 1, 2 was evaluated by the A-method (Gurley method) in conformity with JIS L1096-8.20.1(a). The results are shown in TABLE 1.

4-5) Evaluation of Punching of Composite Substrate:

A butyl-rubber, double-faced adhesive tape having thickness of 3 mm (available from Nitto Denko Corporation) was stuck on the each resin-coated glass fiber cloth 1, 2 obtained above. Then, the resin-coated glass fiber cloth 1, 2 was put on a polyester felt having a thickness of 10 mm through an exfoliate paper and was punched out by use of the Thomson die cutter at 0.4N/cm$^2$. Then, the die-cut surface was visually observed to evaluate the punching. The results are shown in TABLE 1. In TABLE 1, the marks A and B indicate the states described below.

A: No fuzz was found; and
B: Some fuzz was found.

TABLE 1

| Prescription | Resin-coated glass fiber cloth 1 | Resin-coated glass fiber cloth 2 |
|---|---|---|
| Amino silane | 0.7 | 0.7 |
| Bisphenol A type epoxy resin | 18 | 18 |
| Acrylic ester copolymer resin | 0.4 | — |
| Dicyandiamide | 2 | 2 |
| 2-methylimidazole | 0.2 | 0.2 |
| Ammonia | 0.1 | — |
| Solids content (weight %) | 21.3 | 20.9 |
| Viscosity (×10$^{-3}$ Pa · sec.) | 600 | 250 |
| Coverage (weight %) | 4 | 4 |
| Air permeability (cm$^3$/cm$^2$/sec.) | 0.01 | 0.8 |
| Permeability rate (%) | 60 | 90 |

TABLE 1-continued

| Prescription | | Resin-coated glass fiber cloth 1 | Resin-coated glass fiber cloth 2 |
|---|---|---|---|
| Tensile strength | Vertical (N) | 850 | 930 |
| | Horizontal (N) | 700 | 750 |
| Elasticity modulus (N/mm$^2$) | | 11,000 | 12,000 |
| Flexibility | Vertical (N) | 780 | 815 |
| | Horizontal (N) | 720 | 743 |
| Easiness to punch | | A | A–B |

(Preparation of Resin Layer)

The respective components of the foam composition were blended in the blending prescription shown in TABLE 2, and the respective components of the rubber composition were blended in the blending prescription shown in TABLE 3. Then, those mixtures were kneaded respectively by the pressure kneader, to prepare the kneaded materials 1-3.

TABLE 2

| | Prescription | Kneaded material 1 | Kneaded material 2 |
|---|---|---|---|
| Blending prescription of foam composition | SBR | 50 | — |
| | Epoxy resin    A | 50 | — |
| | B | — | 100 |
| | Epoxy-modified SBS | 10 | — |
| | Foaming agent | 1.5 | 8 |
| | Epoxy resin curing agent | 5 | 6.5 |
| | Sulfur (rubber cross-linking agent) | 10 | — |
| | Zinc oxide (cross-linking accelerator) | 5 | — |
| | Cross-linking accelerator | 10 | — |
| | Heavy calcium carbonate (Filler) | 105 | 110 |
| | Terpene-aromatic liquid resin (Tackifier) | 20 | — |
| | C5/C9 petroleum resin (Tackifier) | 40 | — |
| | Carbon black (pigment) | 3 | 0.7 |

TABLE 3

| | Prescription | Kneaded material 3 |
|---|---|---|
| Blending prescription of rubber composition | Butyl-rubber | 100 |
| | Heavy calcium carbonate (Filler) | 170 |
| | C5 petroleum resin (Tackifier) | 70 |
| | Liquid resin (softening agent) | 70 |
| | Carbon black (pigment) | 50 |

It is to be noted that the figures in TABLES 2 and 3 are expressed in the same units, "parts by weight", and the details of the respective components are given below.

SBR: Styrene-butadiene random copolymer of 240,000 in number average molecular weight, 25 weight % styrene content, and 35 in Mooney viscosity (ML1+4, at 100° C.), Epoxy resin A: Semisolid bisphenol A type epoxy resin of 250 g/eqiv. in epoxy equivalent, Epoxy resin B: Dimer acid modified epoxy resin of 650 g/eqiv. in epoxy equivalent, Epoxy-modified SBS: Epoxy-modified styrene•butadiene•styrene block copolymer of 40 weight % styrene content, and 1,067 g/eqiv. in epoxy equivalent (EPOFRIEND® AT501 available from DAICEL CHEMICAL INDUSTRIES, LTD.)

Foaming agent: 4,4'-oxybis(benzene sulfonyl hydrazide)

Epoxy resin curing agent: Dicyandiamide,

Cross-linking accelerator: Dibenzothiazyl disulfide, and

Liquid resin: Terpene liquid resin.

(Production of Adhesive Sheet for Steel Plate)

Each of the kneaded materials 1-3 obtained was rolled into a sheet form of 0.6 mm thick by using the calendar roll, to form the resin layer. Then, each of the resin-coated glass fiber cloths 1-4 obtained, serving as the restricting layer, was stuck on one side of the resin layer under pressure by using the calendar roll as in the combination shown in FIG. 4 and the exfoliate paper was stuck on the other side of the resin layer opposite to the side thereof on which the restricting layer was stuck. The adhesive sheets for steel plate of Examples 1-3 and Comparative Examples 1-6 were produced in this manner.

(Evaluation)

The reinforcing effect, the adhesiveness to an oiled steel plate under low temperature, and the volatile components were evaluated for Examples 1 and 2 and Comparative Examples 2 and 4. Also, the vibration damping, the drop-off at the time of heating, and volatile components were evaluated for Example 3 and Comparative Example 6. The results are shown in TABLE 4. It is to be noted that these evaluations were unable to be carried out for Comparative Examples 1, 3 and 5, because their resin layers were setoff.

1) Test on Reinforcing Effect

A rust-preventive agent (Daphne Oil Z-5 available from IDEMITSU KOSAN CO., LTD.) was applied to a surface of a cold-rolled steel plate (SPCC-SD available from Nippon Testpanel Co., Ltd.). Then, the resulting steel plate was rested in an upright position at 20° C. for the duration of a night, for an oil treatment. (Hereinafter, the cold-rolled steel plate as was subjected to the oil treatment is referred to as the oiled, cold-rolled steel plate.)

After the exfoliate paper of the adhesive sheet for steel plate was peeled off, the adhesive sheet for steel plate was adhesively bonded to the oiled, cold-rolled steel plate of 25 mm wide, 150 mm long, and 0.8 mm thick under the atmosphere of 20° C. Then, it was heated at 160° C. for 20 minutes to foam the resin layer. The test piece was obtained in this manner. The same operation was carried out for Examples 1 and 2 and Comparative Examples 2 and 4, to obtain the respective test pieces.

Then, after each test piece was supported with the span of 100 mm, with the steel plate up, the testing bar was moved down on the lengthwise center portion of the test piece from above in a vertical direction at a rate of compression of 1 mm/min. and was pressed down against the steel plate until the foam layer was bent or displaced by 1 mm from its original position. This bend of the foam layer was taken as the bending strength (N), which was evaluated as the reinforcing effect.

2) Test on Adhesiveness to Oiled Steel Plate Under Low Temperature:

The adhesive sheet for steel plate was cut into pieces of 25 mm wide and then the exfoliate paper was peeled off therefrom. Then, the respective pieces of the adhesive sheet for steel plate were press-contacted with the oiled surfaces of the oiled, cold-rolled steel plates by the rollers of 2 kg under the atmosphere of 5° C. After 30 minutes passed, the 90° peel test (tensile speed: 300 mm/min.) was carried out to measure the adhesion (N/25 mm), and the measured values were evaluated as the adhesiveness to oiled steel plate under low temperature. The same operation was carried out for Examples 1 and 2 and Comparative Examples 2 and 4.

3) Test on Vibration Damping:

After the exfoliate paper of the adhesive sheet for steel plate of each of Example 3 and Comparative Example 6 was peeled off, the adhesive sheet for steel plate was adhesively bonded to the oiled, cold-rolled steel plate of 10 mm wide, 220 mm long, and 0.8 mm thick. Then, it was heated at 180° C. for 20 minutes and thereafter cooled down to room temperature. Then, a loss factor η used as a measure of vibration damping was measured by the center excitation method.

4) Drop-off at Heating:

The adhesive sheet for steel plate of each of Example 3 and Comparative Example 6 was cut into pieces of 50 mm wide and 10 mm long and then the exfoliate paper was peeled off therefrom. Then, each piece of the adhesive sheet for steel plate was press-contacted with the oiled surface of the oiled, cold-rolled steel plate by reciprocating the rollers of 2 kg once. Then, the steel plate was set obliquely from the normal so that a surface of the steel plate on a side thereof on which the adhesive sheet was stuck can form an angle of 70° with the installation floor. Then, the steel plate combined with the adhesive sheet for steel plate was baked at 180° C. for 30 minutes. Thereafter, the deformation and drop-off of the adhesive sheet for steel plate was examined.

5) Test on Volatile Components:

The adhesive sheet for steel plate of each of Examples 1-3 and Comparative Examples 2, 4, 6 was cut into pieces to have an area of 80 cm$^2$ to prepare test samples. Then, formaldehyde was collected from the respective test samples using the tedler-pack of 10 L and measured quantitatively by the gas chromatograph.

It can be seen from TABLE 4 that the adhesive sheets for steel plate of all Examples provide significant abatement in emission of volatile components (formaldehyde), while providing good reinforcing effect and vibration suppression effect, as compared with Comparative Examples using melamine resin.

It is to be noted that in all Comparative Examples using the glass fiber cloth having a large permeability rate, the resin layer was offset, so that the evaluation was incapable.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. An adhesive sheet for steel plate comprising:
a restricting layer; and
a resin layer,
wherein the restricting layer comprises a resin-coated glass fiber cloth made by weaving glass fiber bundles, which are formed by bundling a plurality of glass filaments, into a glass fiber cloth and impregnating water dispersed epoxy resin composition in the glass fiber cloth, the

TABLE 4

| | Example/Compara. Ex. | | | | | |
|---|---|---|---|---|---|---|
| | Ex. 1 | Compara. Ex. 2 | Ex. 2 | Compara. Ex. 4 | Ex. 3 | Compara. Ex. 6 |
| Restricting layer | Resin-coated glass fiber cloth 1 | Resin-coated glass fiber cloth 3 | Resin-coated glass fiber cloth 1 | Resin-coated glass fiber cloth 3 | Resin-coated glass fiber cloth 1 | Resin-coated glass fiber cloth 4 |
| Resin layer | Kneaded material 1 | Kneaded material 1 | Kneaded material 2 | Kneaded material 2 | Kneaded material 3 | Kneaded material 3 |
| Reinforcing effect (N) | 25.0 | 25.4 | 27.8 | 27.7 | — | — |
| Adhesiveness to oiled-surface under low temperature (N/25 mm) | 2.1 | 2.0 | 0.4 | 0.3 | — | — |
| Loss factor η | — | — | — | — | 0.258 | 0.284 |
| Drop-off at heating | — | — | — | — | No drop-off | No drop-off |
| Amount of formaldehyde generated (μg/test sample) | 1.26 | 4.07 | 1.28 | 4.10 | 1.28 | 4.12 |

| | Example/Compara. Ex. | | |
|---|---|---|---|
| | Compara. Ex. 1 | Compara. Ex. 3 | Compara. Ex. 5 |
| Restricting layer | Resin-coated glass fiber cloth 2 | Resin-coated glass fiber cloth 2 | Resin-coated glass fiber cloth 2 |
| Resin layer | Kneaded material 1 | Kneaded material 2 | Kneaded material 3 |
| Reinforcing effect (N) | Because of setoff of resin layer, measurement was incapable. | | |
| Adhesiveness to oiled-surface under low temperature (N/25 mm) | | | |
| Loss factor η | | | |
| Drop-off at heating | | | |
| Amount of formaldehyde generated (μg/test sample) | | | | resin-coated glass fiber cloth having air permeability of not more than 0.5 cm$^3$/cm$^2$/sec. and a permeability rate of the epoxy resin composition to the glass fiber bundles in the range of 20-70% and wherein the epoxy resin composition in the resin-coated glass fiber cloth comprises 1-10 parts by weight of acrylic acid polymer as a thickening agent per 100 parts by weight of the epoxy resin composition and is impregnated in the glass fiber cloth in a proportion of 2-15 parts by weight of the epoxy resin composition per 100 parts by weight of the glass fiber cloth; and wherein a mixing ratio of the acrylic acid polymer to a total amount of water dispersion of the epoxy resin composition is in a range of 0.2-2.0 weight %.

2. The adhesive sheet for steel plate according to claim 1, wherein a mass of the glass fiber cloth is in the range of 150-300 g/m$^2$.

3. The adhesive sheet for steel plate according to claim 1, wherein the resin layer is formed from foam composition comprising epoxy resin and an foaming agent.

4. The adhesive sheet for steel plate according to claim 1, wherein the resin layer is formed from foam composition comprising aromatic epoxy resin, styrene synthetic rubber, and a foaming agent.

5. The adhesive sheet for steel plate according to claim 1, wherein the resin layer is formed from rubber composition comprising rubber.

6. An adhesive sheet for steel plate, comprising:
a restricting layer; and
a resin layer,
wherein the restricting layer comprises a resin-coated glass fiber cloth made by a method comprising
weaving glass fiber bundles, which are formed by bundling a plurality of glass filaments, into a glass fiber cloth; and
impregnating water dispersed epoxy resin composition in the glass fiber cloth, wherein the epoxy resin composition in the resin-coated glass fiber cloth comprises 1-10 parts by weight of acrylic acid polymer as a thickening agent per 100 parts by weight of the epoxy resin composition and is impregnated in the glass fiber cloth in a proportion of 2-15 parts by weight of the epoxy resin composition per 100 parts by weight of the glass fiber cloth, and wherein pH of the epoxy resin composition is controlled such that viscosity of the epoxy resin composition results in a permeability rate of the epoxy resin composition to the glass fiber bundles in the range of 20-70%;
wherein a mixing ratio of the acrylic acid polymer to a total amount of water dispersion of the epoxy resin composition is in a range of 0.2-2.0 weight %; and
wherein the resin-coated glass fiber cloth has air permeability of not more than 0.5 cm$^3$/cm$^2$/sec.

* * * * *